March 27, 1934.   F. J. MacDONALD   1,952,628
FOOTWEAR AND THE LIKE AND METHOD AND APPARATUS FOR PRODUCING THE SAME
Filed Dec. 31, 1931   6 Sheets—Sheet 3

Inventor:
Frank J. MacDonald,
by Eakin & Avery
Att'ys.

March 27, 1934.   F. J. MacDONALD   1,952,628
FOOTWEAR AND THE LIKE AND METHOD AND APPARATUS FOR PRODUCING THE SAME
Filed Dec. 31, 1931   6 Sheets-Sheet 4

Inventor:
Frank J. MacDonald
by Eakin & Avery
Att'ys.

March 27, 1934.  F. J. MacDONALD  1,952,628
FOOTWEAR AND THE LIKE AND METHOD AND APPARATUS FOR PRODUCING THE SAME
Filed Dec. 31, 1931   6 Sheets-Sheet 5

Inventor
Frank J. MacDonald.
by Eakin & Avery
Att'ys.

Patented Mar. 27, 1934

1,952,628

UNITED STATES PATENT OFFICE 1,952,628

FOOTWEAR AND THE LIKE AND METHOD AND APPARATUS FOR PRODUCING THE SAME

Frank J. MacDonald, Brookline, Mass., assignor, by mesne assignments, to Hood Rubber Company, Inc., Wilmington, Del., a corporation of Delaware Application December 31, 1931, Serial No. 584,027

20 Claims. (Cl. 12—142)

This invention relates primarily to the manufacture of footwear, and especially to the manufacture of tennis and other types of fabric shoes requiring localized reinforcement or ornamentation of their uppers.

In shoes of the fabric topped variety as constructed heretofore it has been common to secure to the upper the various reinforcing and decorating parts, including the eyelet stays, back and side stays, counter, ankle patch, etc., which for brevity may be referred to as "trim" of the upper, by sewing these parts to the fabric of the upper. These parts have usually been of leather or of rubberized fabric and their proper attachment to the fabric of the upper has involved a dependence to a large degree upon the skill of the operator and has required many sewing and handling operations. Moreover in the final product, the materials in the zones of the stitching of the trim parts has been subject to deterioration from the severe strains of flexure and exposure to moisture incident to use, especially in the case of athletic footwear, and loosening of trim parts, localized rupture, and excessive sagging and wrinkling of the materials has often resulted.

Chief among the objects of the invention are to provide for eliminating these and other difficulties in the construction of such footwear, to provide for high quality in the product without requiring a high degree of skill on the part of the operator, to facilitate the rapid and economical manufacture of the product, and to provide an article of footwear of improved quality and greater attractiveness and with economy of materials.

These and further objects will be apparent from the following description of a preferred embodiment of the invention, reference being had to the accompanying drawings, in which.

Figure 1:
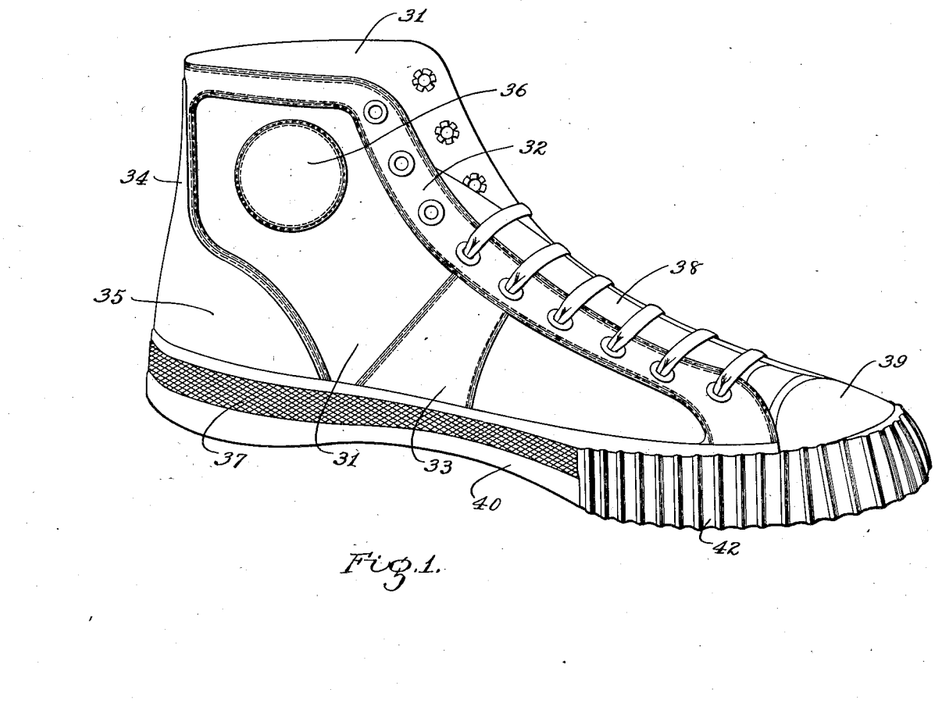
Fig. 1 is a perspective view of a completed shoe embodying and made in accordance with the invention in its preferred form.
Figure 10:
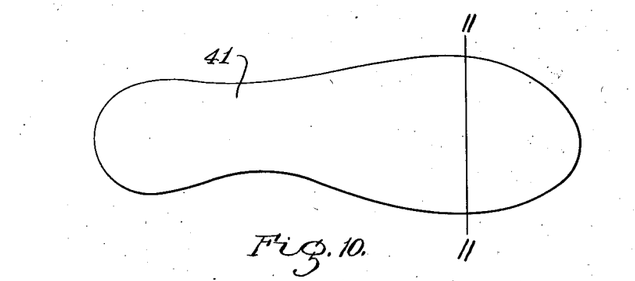
Figure 11:
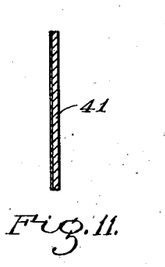
Figure 12:
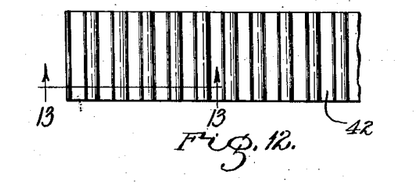
Fig. 12 is a side view partly broken away of the toe reinforcing strip.
Figure 13:
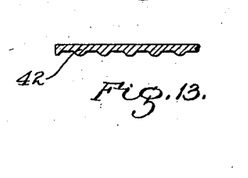
Fig. 13 is a sectional view taken along the line 13—13 of Fig. 12.
Figure 14:
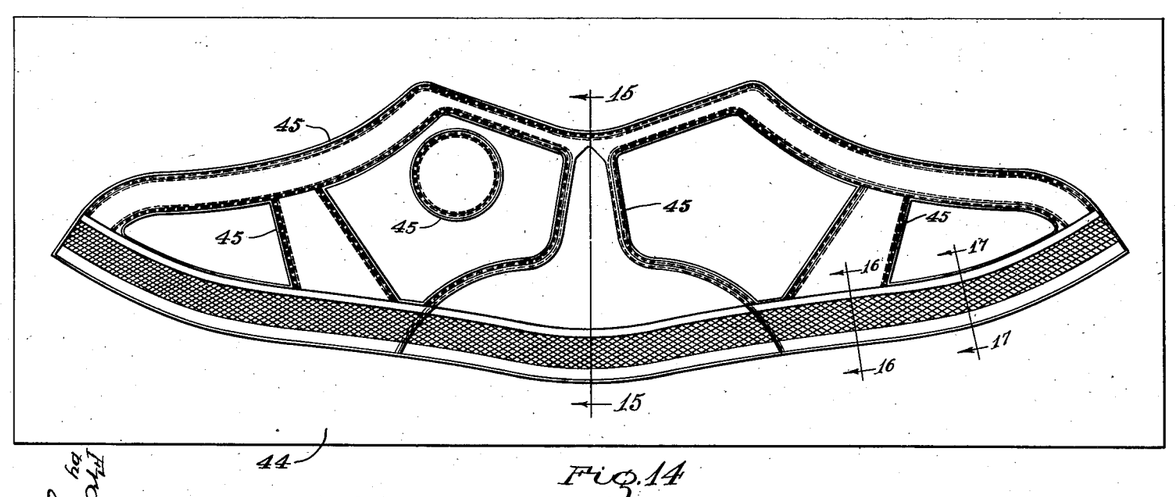
Fig. 14 is a plan view of a mold or forming plate used in making the shoe upper.
Figure 15:
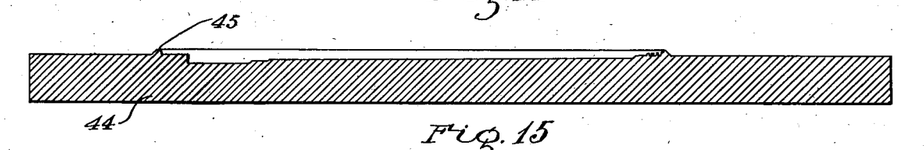
Figs. 15, 16 and 17 are enlarged sectional views taken along the lines 15—15, 16—16 and 17—17, respectively, of Fig. 14.
Figure 16:
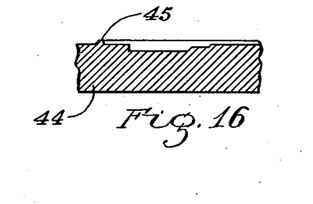
Figure 17:
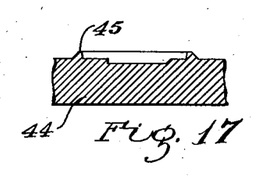

Referring to the drawings, Fig. 1 shows a finished article of footwear of the tennis shoe type constructed according to the invention. The upper of the shoe comprises a fabric backing 31 having on its outer surface a plurality of reinforcing and decorative components which for brevity will be referred to as the "trim" of the upper, including eyelet stays 32, side stays 33, back stay 34, counter 35, ankle patch 36 and foxing 37. A combined tongue 38 and toe piece 39 is provided, and the shoe is built with an outsole 40, secured to the upper at its lower edge, and an insole 41 (Fig. 10). An external toe reinforcing strip 42 may also be provided.

Figures 2, 3, 4, 5, 6, 7:
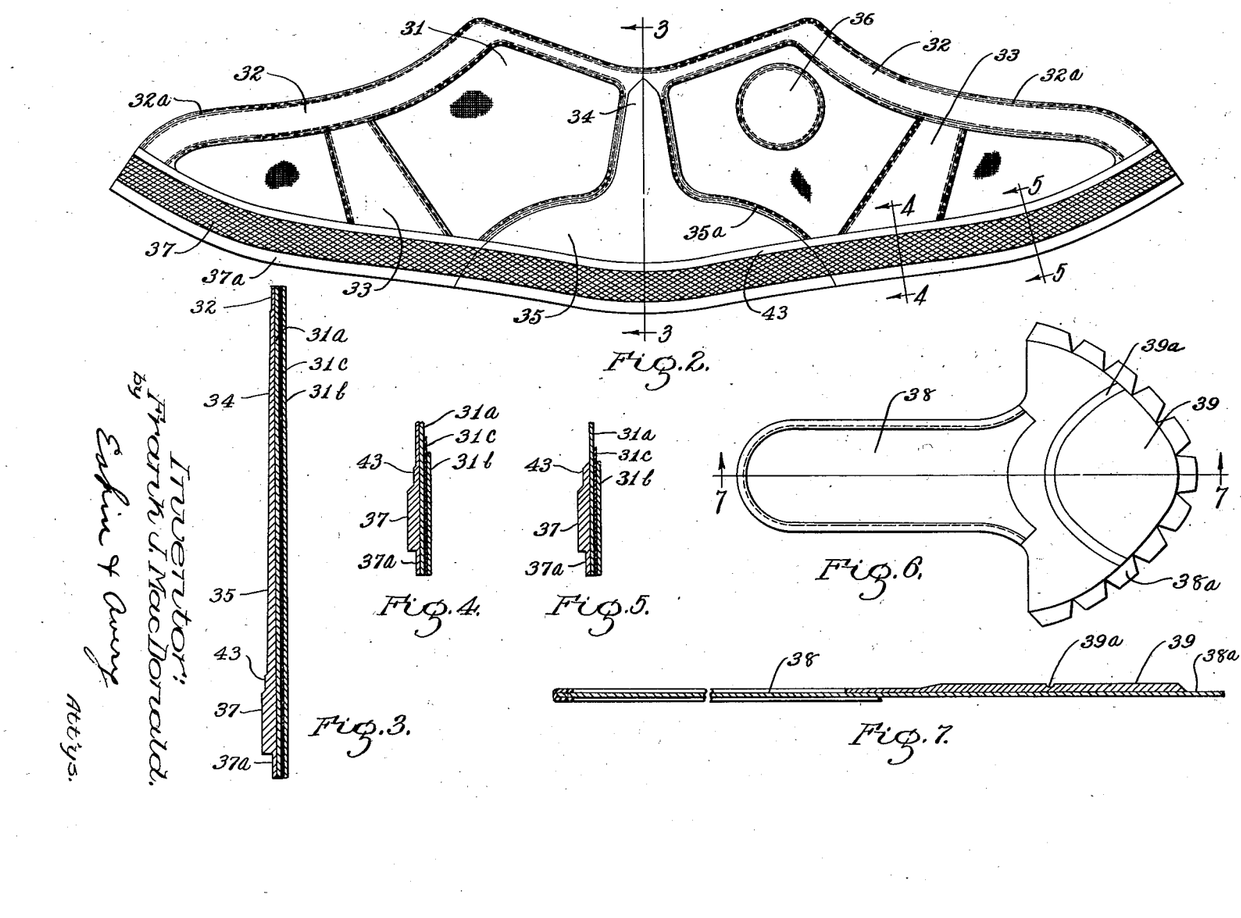
Fig. 2 is a side view of the shoe upper as it appears in flattened form prior to its being built into the shoe.
Figs. 3, 4 and 5 are enlarged sectional views taken along the lines 3—3, 4—4 and 5—5, respectively, of Fig. 2.
Fig. 6 is a plan view of the combined tongue and toe piece as it appears in a flattened state prior to its being built into the shoe.
Fig. 7 is an enlarged sectional view taken along the line 7—7 of Fig. 6.
Figure 8:
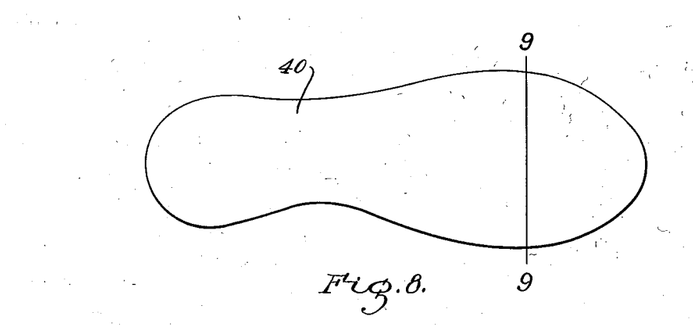
Figs. 8 and 10 are plan views of the shoe outsole and insole, respectively.
Figure 9:
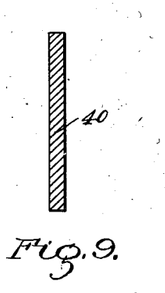
Figs. 9 and 11 are sectional views taken along the lines 9—9 of Fig. 8, and 11—11 of Fig. 10 respectively.

Contrary to prior procedures, the construction of the shoe upper according to the preferred embodiment of this invention requires no sewing operations in the formation of the fabric backing and in the attachment thereto of the trim components. Referring especially to Fig. 2, which shows the shoe upper in a flattened state before being built into the shoe, the trim components are provided as localized deposits of plastic material, preferably a flexible rubber composition, securely bonded to the fabric over the entire area of the components by adhesion.

The backing of the upper may consist of a single thickness of fabric, but preferably consists of a double layer of fabric, the two layers, indicated at 31a and 31b in Figs. 3, 4 and 5, being held together by an intervening layer of cementitious material, preferably a rubber cement, 31c.

The fabric layer 31b constitutes a lining in the finished shoe, and in addition to the increased strength afforded by the plied construction, the secure attachment of the trim parts to the backing of the upper is materially contributed to by the intervening cementitious layer 31c, to which the plastic material of the trim parts, on passing through the interstices of the outer fabric 31a, or far enough thereinto to contact the rubber of the intervening layer, may become bonded to provide a strong interlock with the fabric over the entire area of the trim parts.

For such parts as the counter 35, back stay 34 and foxing 37, which usually require greater stiffness than other parts of the upper, the plastic material may be formed to greater thickness, as indicated in the sectional views of Figs. 3, 4 and 5, according to the zone stiffness desired, and this avoids the necessity for incorporating any auxiliary stiffening member, such as an internal heel counter, in the shoe upper, as has been customary in prior constructions.

The margins of certain of the trim components are preferably formed of decreasing thickness toward the edge of the component as shown for example at 43 in Figs. 4 and 5, so that the material of the trim component and the fabric will be caused to flex over a comparatively wide zone with good distribution of the strains of flexure as compared with the localization of strains caused by the sharp line of flexure at the stitching of prior constructions which are subject to overstraining and premature deterioration of the materials. The strength of the improved construction is materially contributed to, moreover, by the adhesion of the components, which is effective throughout their areas, and by the interlocking of the material of the components with the fabric in conjunction with the cementitious material between the fabric layers, these features resulting in strong reinforcement of the fabric with the desired degree of flexibility.

The combined tongue and toe cap comprises a localized deposit of the plastic material at the forward portion of the fabric of the tongue 38 to provide the toe cap 39, as shown most clearly in Figs. 6 and 7, and the fabric preferably is formed with a sole attaching margin at its forward edge, as shown at 38a. The toe cap may be suitably indented, as indicated at 39a, for the purposes of ornamentation and facilitating flexure, and rearwardly of this indentation the material may be of decreasing thickness, as shown in Fig. 7, to facilitate distribution of the strains of flexure and prevent undue localization thereof. The trim components of the upper may if desired be provided with indentations or other formations in the plastic material for decorative purposes, as indicated for example at 32a and 35a in Fig. 2, and, as shown, the foxing 37 may have a knurled surface for ornamentation.

The provision of these various characteristics in the upper and combined tongue and toe cap, including the bonding of the plastic material to the fabric over the entire areas of the components, the formation of the material to the desired variations in thickness, and the provision of ornamentations and attractive finish on the surface of the components, is facilitated as to all of these characteristics by the preferred procedure, which has the advantages also of simplicity and economy in manufacture.

According to such procedure the plastic material, preferably an unvulcanized rubber composition, is preliminarily deposited on a support in determinate areas corresponding to the shape of the trim components, and the fabric backing is then pressed into adhesion with the material to permit removal of the fabric with the plastic material properly located thereon. Preferably, the support is suitably recessed to provide for the varying thicknesses and the surface ornamentation of the plastic material, and means is provided in conjunction with the support to delineate the areas of the deposits and resist spreading of the material so that during the pressing of the fabric thereagainst the material will be molded to the desired shape against the fabric with resulting well defined margins of the components.

The procedure may be facilitated by use of the apparatus shown in Figs. 14 to 22. A mold or forming plate 44, constituting a support for preliminarily receiving the deposits of the plastic material, is cavitied in its upper surface, as shown most clearly in Figs. 14 to 17, to correspond in configuration, depth and location with the trim components in their flattened condition of Fig. 2. Surrounding the cavities at their margins are upwardly-projecting narrow mold ridges 45, preferably having upwardly tapered sidewalls and having flat, narrow top surfaces lying above the adjacent surfaces of the mold to facilitate subsequent severance and removal of surplus stock, and to confine the trim material to the desired areas. The mold may be of metal or any suitable material, but preferably comprises a phenolic resin or other composition which permits ready duplication of the mold from a master mold or from a master negative die and which may be given a smooth, hard surface for producing a fine finish on the surface of the plastic material.

Figures 18, 19, 20:
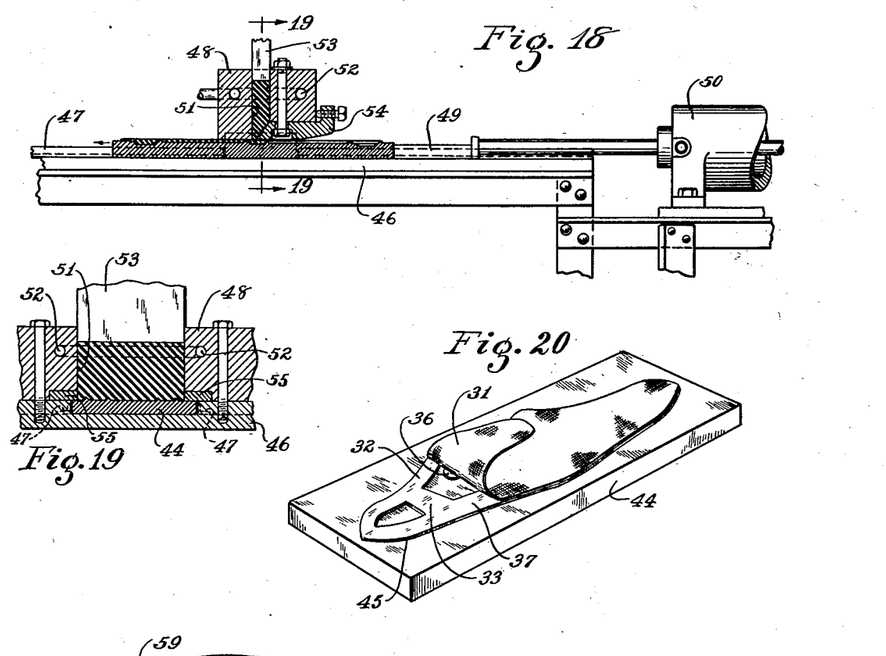
Fig. 18 is a side view, partly broken away and in section, of mold filling apparatus embodying the invention.
Fig. 19 is a sectional view taken along the line 19—19 of Fig. 18.
Fig. 20 is a perspective view of a mold plate and shoe upper at a stage in manufacture.

The operation of depositing the plastic material on the mold plate 44 may be carried out efficiently by means of the apparatus of Figs. 18 and 19. A table support 46, having a pair of spaced, parallel guide rails 47, 47 on its upper surface, is adapted to support and guide the mold 44 while the latter is moved in a straight line, from right to left in Fig. 18, beneath an extruding device 48. A ram 49, operated by the piston of a fluid pressure cylinder 50, is provided for thus moving the mold.

The extruding device 48 comprises a vertically disposed chamber 51 for the plastic material, and the casing of the chamber is preferably cored at 52 for the circulation of a heating fluid. At the upper end of the chamber 51 is mounted for vertical movement a plunger 53 adapted to urge the plastic material downward, and at the lower end of the chamber there is provided an extrusion nozzle having an aperture of such width transversely of the mold as to permit extrusion of the plastic material over the entire width of the cavitied area of the mold, and of the proper extent of opening longitudinally of the mold to cause extrusion of a continuous sheet of the material over the surface of the mold as the latter is moved past the nozzle. For regulating the extent of nozzle opening an adjustable nozzle member is provided, as shown at 54.

The extruding device is preferably mounted with the nozzle in such vertically spaced relation to the mold as to deposit a cavity-filling sheet of the plastic material of sufficient thickness to cover the mold ridges 45, the material at the tops of the ridges being deposited in a layer of sufficient thinness so that while there is no contact between any part of the extruding device and the ridges, such as might cause objectionable wear of the latter, the surplus material may be subsequently severed from the material in the cavities by simply tearing the sheet of material along the narrow zones of thinness in the sheet at the ridges. For the purpose of limiting the flow of the material laterally of the mold the extruding device at the sides of the nozzle is provided with side closure members 55, 55 (Fig. 19) adapted to contact the upper surface of the mold in sliding relation therewith at the lateral margins only of the mold plate surface.

Figure 22:
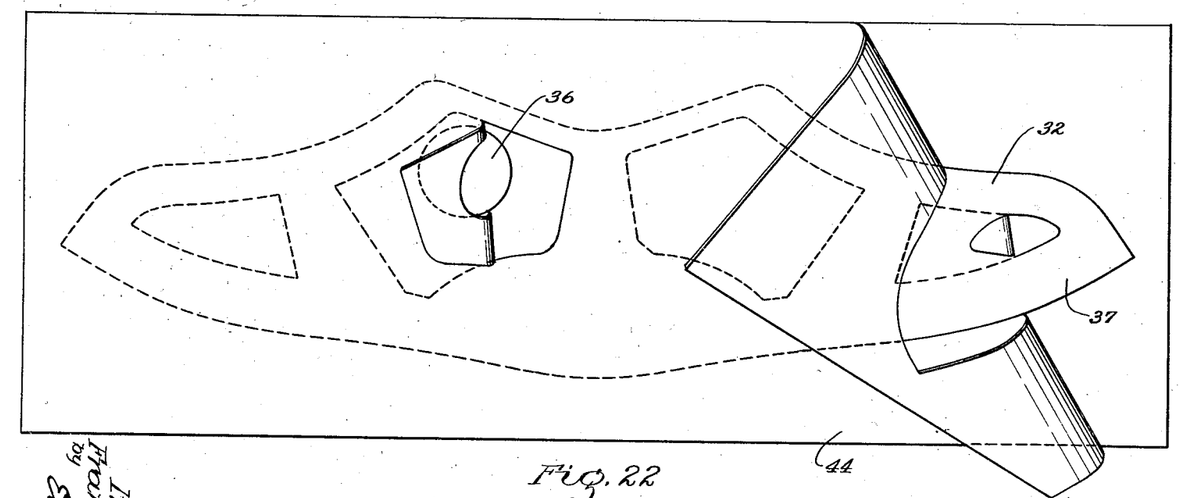
Fig. 22 is a plan view of the mold plate showing the manner of stripping away the surplus stock.

After the mold plate has been passed through the extruding device, the surplus material of the deposited sheet around the cavities is removed by tearing or otherwise severing the sheet along the narrow ridges of the mold, in the manner illustrated in Fig. 22, the material of the trim components being permitted to remain in the cavities.

The fabric backing 31, cut to the desired shape, is now placed in proper position over the filled cavities of the mold, as illustrated in Fig. 20, and is pressed into adhesive engagement with the material, preferably under the influence of heat. If desired, a cementitious material may be applied to the surfaces of the parts to be adhered, although this is not essential in all cases to obtain good adhesion with the fabric.

Figure 21:
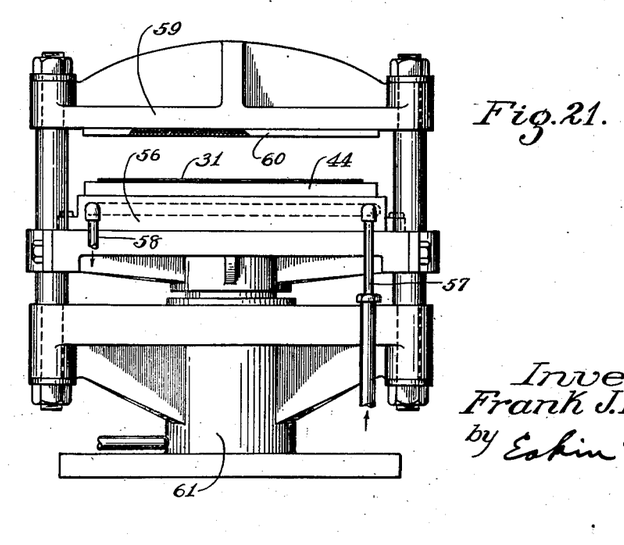
Fig. 21 is a side view, partly broken away, of a press constructed according to and utilized in the preferred procedure of the invention.

The pressing of the fabric against the plastic material may be conveniently effected by means of the press apparatus shown in Fig. 21, which comprises a lower, vertically-movable platen 56 having a cored interior for the passage of a heating fluid, the inlet and outlet conduits being shown at 57 and 58, and an upper, stationary platen 59 which is not heated but has on its face a pad 60 of suitable material, such as laminated rubberized fabric. A fluid pressure cylinder 61 is provided for vertically moving the lower platen.

The mold 44 is placed on the lower platen with the fabric 31 upwardly exposed, and on closing the press, the fabric 31 is caused to be pressed against the plastic material in the mold cavities, the pad causing the fabric to be pressed with substantially uniformly distributed pressure against the plastic material in the cavities despite the presence of the upstanding mold ridges 45 at the margins of the cavities. Uniform and adequate pressing is facilitated also by the fact that the plastic material is deposited in such depth that its upper surface lies slightly above the tops of the ridges 45, as hereinbefore explained, which assures intimate contact of the material and the fabric backing and effective pressing of these two together throughout the area of the trim components. The mold is permitted to remain in the press for a time sufficient for the heat from the lower platen to cause the platen material to fill completely the mold cavity and to become firmly adhered to and interlocked with the fabric, but preferably not to completely vulcanize the material, the final cure being given preferably after assembly of the shoe parts.

The combined tongue and toe cap may be made by a procedure similar to the above described for the upper, and mold plate for this part of the manufacture being of course formed with a cavity suitably shaped to form the toe cap 39 of the plastic material, to be pressed into adhesion with the fabric backing 38 over the desired area of the latter.

The upper is provided with eyelets in its lacing stays in a known manner, and the upper and the combined tongue and toe cap may then be assembled with the insole 41 on a last. The sole attaching margin 38a of the toe cap and the margin 37a of the upper are bent around the lower edge of the last and are secured, as by means of a cement, to the marginal zone of the bottom of the insole, the latter having been previously placed against the bottom of the last. The outsole 40 is then secured in place against the exposed surfaces of the margins 37a, 38a and against the insole 41, preferably with the use of a cement and by pressing or molding the sole against the shoe assembly.

The invention makes possible the provision of strength in the footwear in the zones where it is most desired while making it possible to economize on materials in the zones where they are not required, and at the same time there is provided greater attractiveness in appearance of the article and comfort to the wearer. The qualities of great strength and wear resistance are provided in the same shoe with the qualities of light weight and comfort giving flexibility. The elimination of stitching, which is subject to rapid deterioration and easy rupture, renders the shoe thoroughly washable without injury, and, due to the elimination of seams on the inside of the upper, the shoe may be worn without the discomfiture caused by such means and so without a sock.

Although the preferred embodiment of the invention has been described with reference to fabric as the material of the backing portion of the upper and rubber composition as the plastic material of the reinforcement, it will be understood that other sheet materials, such for example as leather, felt or paper may be utilized instead of fabric, and that cellulose compounds or other plastic compositions may be used in substitution of the rubber composition in the practice of the invention.

As many of the procedural and other advantages of the invention may be availed of in the practice of the invention in the manufacture of articles other than footwear, the invention is not to be taken as wholly limited by the form of the illustrated embodiment except as it is defined in the following claims:

What is claimed is:

1. An article of footwear comprising an upper of fabric having a marginal reinforcement comprising a single, integral, annular, mold-shaped deposit of initially plastic material extending over a determinately limited area of the sheet material coextensive with the entire margin of the upper including the lower margin thereof, the fly margins and the top margin and secured solely by adhesion to the fabric throughout said area.

2. An article of footwear comprising an upper of a plurality of layers of fabric held together by intervening cementitious material and a reinforcement composed of mold-shaped rubber composition extending over a clear-cut, determinately limited area of the fabric and secured solely by interlocking adhesion to the fabric throughout said area, said cementitious material being united to the mold-shaped rubber composition by rubber extending through the interstices of the outer ply of fabric.

3. An article of footwear comprising an upper of fabric and a reinforcement composed of mold-shaped rubber composition extending over a clear-cut, determinately limited area of the fabric coextensive with the entire fly-margins of the latter and secured solely by adhesion to the fabric throughout said area.

4. An article of footwear comprising an upper of fabric and a reinforcement composed of mold-shaped rubber composition extending over a determinately limited area of the fabric coextensive with the entire margin of the latter and secured by adhesion to the fabric throughout said area, the composition at the lower margin of the upper comprising a zone of comparatively great thickness and being of decreasing thickness toward the margin of said area.

5. An article of manufacture comprising a plurality of layers of fabric held together by an intervening layer of cementitious material and a deposit of initially plastic material covering a clear-cut, determinately limited area of a face of the fabric and adhered thereto over said area and united by rubber extending through interstices in the adjacent layer of fabric to the said layer of cementitious material.

6. The method of making footwear which comprises forming from sheet material a footwear upper and mold-shaping a plastic material in adhesive engagement with said upper over a determinately limited area of the same, all of the plastic material in the finished footwear being concurrently set in a final non-plastic condition by a single setting operation.

7. A method of making footwear as defined in claim 6 in which the plastic material is mold-shaped against the upper while the latter is in a flattened condition.

8. The method of making a composite article which comprises forming a plied-up structure of a plurality of layers of fabric held together by intervening cementitious material and mold-shaping a plastic material in adhesive engagement with the plied-up structure over a clear-cut determinately limited area of the same, and thereby joining the said plastic material to the said cementitious material through the interstices in the intervening fabric.

9. The method of making footwear which comprises forming from sheet material a footwear upper, applying to a determinately limited area of the upper completely isolated between its marginal zones a deposit of plastic material and adhering it directly to the upper by mold-shaping it against the same.

10. The method of making footwear which comprises forming from sheet material respectively a footwear upper and a combined tongue and toe cap, producing localized deposits of plastic material in determinate configuration on supporting surfaces, superimposing the respective sheet material members thereon in adhesive relationship therewith, then removing the said members together with the plastic material adhering thereto to constitute reinforcements for said upper and combined tongue and toe cap, and assembling said components with an outsole by adhesion.

11. The method of making footwear which comprises forming from sheet material a footwear upper, applying to a determinately limited area of the upper coextensive with its entire fly-margins a reinforcing plastic material and mold-shaping the plastic material and adhering it directly to the upper.

12. The method of producing an embossed sheet of material which comprises producing separate localized deposits of plastic material on a supporting surface in a determinate configuration, superimposing thereon in adhesive relationship therewith a flexible sheet of material, and removing the sheet together with the still plastic deposits from the supporting surface, the same determinate configuration of the deposits being maintained while they receive the sheet and are removed from the supporting surface therewith so that the sheet is kept bare except within the original outlines of the deposits.

13. The method of producing an embossed sheet of material which comprises depositing unvulcanized rubber composition in an open-cavitied member in cavity-conforming disposition therein, pressing a flexible sheet material into adhesive engagement with the surface of the said composition in the cavity so that adhesion will be effected only within the confines of the cavity, and stripping the sheet material from the member with the rubber composition adhered thereto.

14. The method of producing an embossed sheet of material which comprises depositing unvulcanized rubber composition in an open-cavited member in cavity-conforming disposition therein, pressing a flexible sheet material into adhesive engagement with the surface of the said composition in the cavity so that the adhesion will be effected only within the confines of the cavity, and stripping the sheet material from the member with the rubber composition adhered thereto and still in an unvulcanized condition.

15. The method of producing an embossed sheet of material which comprises extruding a plastic material onto a supporting surface having raised ridge portions delineating a determinate configuration, removing surplus material, the material in such removal being separated along said ridge portions, superimposing a backing thereon in adhesive relationship with the remaining plastic material, and removing the backing together with the plastic material adhering thereto.

16. The method of producing an embossed sheet of material which comprises depositing a plastic material on the surface of a cavitied mold member having an upstanding ridge at the margin of the cavity, separating the plastic material at the mold ridge and removing the surplus material around the cavity, pressing a backing into adhesive engagement with the exposed surface of the material in the cavity and removing the backing from the mold member with the still plastic material adhering thereto.

17. The method of producing an embossed sheet of material which comprises depositing unvulcanized rubber composition on the surface of a cavitied mold member having an upstanding ridge at the margin of the cavity, separating the composition at the mold ridge and removing the surplus composition around the cavity, pressing a backing into adhesive engagement with the exposed surface of the composition in the cavity and removing the backing from the mold member with the still unvulcanized composition adhering thereto.

18. The method of producing an embossed sheet of material which comprises depositing on the surface of a cavitied mold member having an upstanding ridge at the margin of the cavity a layer of plastic material to such depth that it fills the cavity and covers the mold ridge with such thinness of the material at the ridge as to permit ready tearing of the latter along the ridge, then separating the deposit and removing the surplus material around the cavity, then pressing a backing into adhesive engagement with the exposed surface of the plastic material in the cavity, and removing the backing from the mold with the plastic material adhering thereto.

19. The method defined in claim 18 in which the plastic material is extruded onto the surface of the mold member by relative movement of the member and the extruding means.

20. The method of producing an embossed sheet of material which comprises extruding a plastic material onto the face of and into the cavity of an open-cavitied member by relative movement of the member and extruding means, removing surplus material from the face of the member, the material in such removal being parted along the margin of the cavity, thereafter pressing a backing into adhesive engagement with the plastic material in the cavity, and removing the backing together with the plastic material adhering thereto.

FRANK J. MacDONALD.